UNITED STATES PATENT OFFICE.

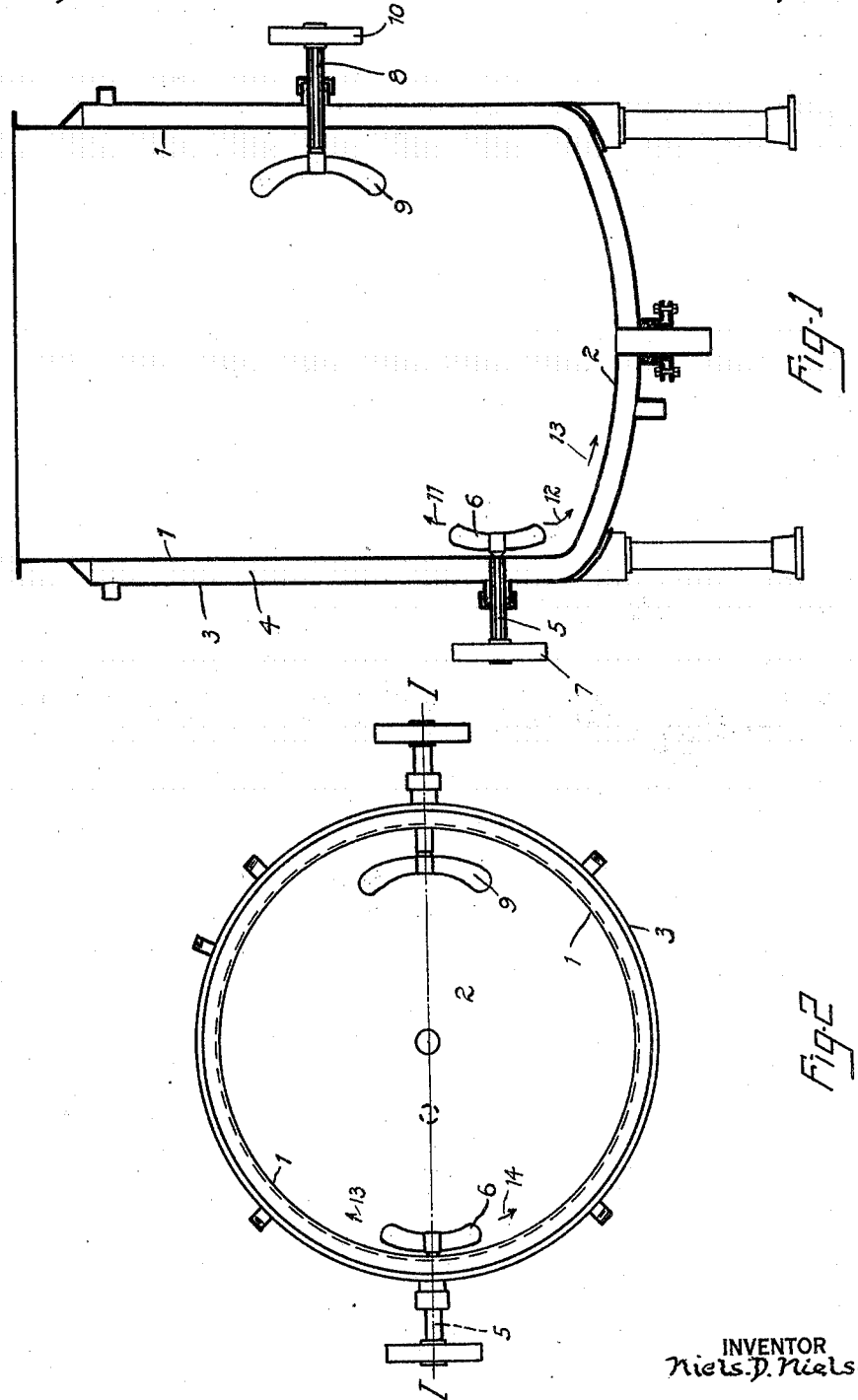

NIELS D. NIELSEN, OF ELYRIA, OHIO.

LIQUID-AGITATING MECHANISM.

1,399,644.  Specification of Letters Patent.  Patented Dec. 6, 1921.

Application filed July 1, 1920. Serial No. 393,426.

*To all whom it may concern:*

Be it known that I, NIELS D. NIELSEN, a citizen of the United States, residing at Elyria, in the county of Lorain and State of Ohio, have invented certain new and useful Improvements in Liquid-Agitating Mechanisms; and I do hereby declare the following to be a full, clear, and exact description of my invention, such as will enable others skilled in the art to which it appertains to make and use the same.

My invention relates to the art of agitating liquids for the purpose of promoting a more homogeneous mixture of the liquid contents of a tank, keeping the same in motion, thoroughly intermingling the particles thereof and exposing the different particles for equal lengths of time to the walls of the container. These walls may be jacketed and jacket may contain a refrigerant or heating medium adapted to act thermally on the tank contents.

It is very important in such devices that the different liquid particles contained in the tank be exposed in their motion to the walls of the container which may contain a refrigerant or heating medium, for equal lengths of time, and to traverse said walls at such speeds that the thermal effect on the different particles will be the same in each case.

The device of my invention is adapted to a wide variety of uses; one of the uses being to promote the emulsification of various kinds of oils or other fatty substances, for instance, in the making of butterine, oleomargarin and the like from a plurality of such solutions; said solutions containing in suspension particles of fat, such as peanut oil, cocoanut oil, cotton seed oil, milk, cream and the like.

An object of my invention is to produce a product consisting of a more homogeneous mixture of the particles of the different substances employed.

These and other objects of my invention, as well as the invention itself, will be better understood from a description of an embodiment thereof, herein illustrated in the drawings in which—

Figure 1 is a diagrammatic representation of an embodiment of my invention comprising a jacketed tank, this figure showing certain of the parts in a side cross sectional view.

Fig. 2 shows a cross-sectional view of the tank illustrated in Fig. 1, looking down in to the tank from above.

Referring now to the drawings, at 1 are shown the side walls of a cylindrical container having a downwardly dished bottom wall, 2. A jacket 3 is provided about the outer walls of the tank, so as to provide a chamber 4 about the outer walls, adapted to be filled with a refrigerant or heating medium for the purpose of thermally affecting the contents of the tank through the walls 1 and 2 thereof. At 5 is shown a propeller shaft passing through a side wall of the tank and extending in line with the axis thereof. The propeller 6 is mounted on the end of this shaft on the inside of the tank and at a point close to the adjacent side wall of the tank for purposes later to be apparent.

A pulley 7 is mounted on the other end of the shaft outside of the tank and may be operated by a suitable source of power, such as an electric motor to which it would be belted, to rotate the propeller 6. The propeller shaft 8 passes through the opposite wall of the tank, both shafts, 8 and 5, being in the same longitudinal plane. The propeller shaft 8 has on its inner end a propeller 9, and on the outer end a pulley 10.

Of course, the pulleys 7 and 10 may be replaced by any other mechanical driving means capable of causing the rotation of the propeller shafts.

I find that this arrangement of propellers in a tank is particularly efficacious for the following reasons:

The propeller 6 being located in close proximity to the side wall of the tank close to the bottom wall will throw from its periphery currents extending substantially in the direction of the arrows 11, 12, 13 and 14, such currents when the propeller blades are rotated, causing a flow of the fluid contents of the tank from the propeller periphery and across the bottom wall substantially as indicated by the arrow, and upward the opposite wall of the tank, whence these bottom currents will travel upwardly coming within range of the fluid flows caused by the propeller 9 which is located in a plane above that of the propeller 6.

The bottom currents which travel swiftly from the periphery of the blade 6 scavenge the bottom, causing any sediment which may fall to the bottom of the tank to be conveyed to the opposite side of the tank and then carried upward into the zone of intermingling currents controlled more by the propeller 9.

The action of the two propellers located in different horizontal planes effectually counteracts the tendency of the liquid to rotate as a whole, which tendency is more pronounced when only a single propeller is used, or a plurality of propellers are used operating in the same plane.

Having thus described my invention, I wish it to be understood that I do not wish to be limited by the specific structure herein illustrated and described, but am aware that numerous and extensive departures can be made from the embodiment herein discussed without departing from the spirit thereof.

What I claim is:

1. In combination, a tank having a saucer-shaped bottom and cylindrical side walls, a propeller shaft projecting through the side walls and a propeller on the end thereof located closely adjacent a portion of the meeting line of the bottom and side walls and adapted when operated to cause liquid to be driven against an upwardly curved portion of the bottom by which it is deflected along the side wall opposite the propeller, a second propeller mounted in the side wall of the tank opposite and above the first propeller adapted to drive across the tank the liquid thus deflected upwardly by the bottom of the tank.

2. In combination, a tank with a bottom having an upwardly inclined part, means to drive liquid contents of the tank thereagainst, a propeller in said tank above and opposite said means to drive across the tank the liquid driven by said means against said inclined bottom portion and deflected upwardly thereby.

3. In combination, a tank, two propellers oppositely mounted in said tank, one of said propellers being above the other and a bottom for said tank having a portion opposite the lowermost propeller curved upwardly.

4. In combination, a tank, cylindrical side walls for the said tank, a bottom wall, a first propeller, a second propeller, said first and second propellers being mounted in the tank on horizontal shafts extending through the side walls, said propellers being located each in a different horizontal plane.

5. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, said propeller shafts being located in the same longitudinal plane.

6. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, one of said propellers being located close to a side wall of the tank and adjacent the bottom wall thereof.

7. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, said propeller shafts being located in the same longitudinal plane, one of said propellers being located close to a side wall of the tank and adjacent the bottom wall thereof.

8. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, each of said propellers being located close to a side wall, one of the said propellers being located adjacent the bottom wall of the said tank.

9. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, said propeller shafts being located in the same longitudinal plane, each of said propellers being located close to a side wall, one of the said propellers being located adjacent to the bottom wall of the said tank.

10. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, each propeller shaft being located in a radius of the said tank.

11. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, each propeller shaft being located in a different radius of the said tank.

12. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, one of said propellers being located close to a side wall of the tank and adjacent the bottom wall thereof, each propeller shaft being located in a different radius of the said tank.

13. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, said lower propeller being so positioned as to throw liquid from its periphery and against the adjacent side walls and bottom wall, said liquid being deflected by the said walls forwardly by the vertical plane in which the said propeller is located.

14. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, one of said propellers being located close to a side wall of the tank and adjacent the bottom wall thereof, said lower propeller being so positioned as to throw liquid from its periphery and against the adjacent side walls and bottom wall, said liquid being deflected by the said walls forwardly of the vertical plane in which the said propeller is located.

15. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, said propeller shafts being located in the same longitudinal plane, one of said propellers being located close to a side wall of the tank and adjacent the bottom wall thereof, said lower propeller being so positioned as to throw liquid from its periphery and against the adjacent side walls and bottom wall, said liquid being deflected by the said walls forwardly of the vertical plane in which the said propeller is located.

16. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, each propeller shaft being located in a different radius of the said tank, one of said propellers being located close to a side wall of the tank and adjacent the bottom wall thereof, said lower propeller being so positioned as to throw liquid from its periphery and against the adjacent side walls and bottom wall, said liquid being deflected by the said walls forwardly of the vertical plane in which the said propeller is located.

17. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, each of said propellers being located close to a side wall, one of the said propellers being located adjacent the bottom wall of the said tank, each propeller shaft being located in a radius of the said tank, said lower propeller being so positioned as to throw liquid from its periphery and against the adjacent side walls and bottom wall, said liquid being deflected by the said walls forwardly of the vertical plane in which the said propeller is located.

18. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, each of said propellers being located close to a side wall, one of the said propellers being located adjacent the bottom wall of the said tank, each propeller shaft being located in a different radius of the said tank, said lower propeller being so positioned as to throw liquid from its periphery and against the adjacent side walls and bottom wall, said liquid being deflected by the said walls forwardly of the vertical plane in which the said propeller is located.

19. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, said propeller shafts being located in the same longitudinal plane, said lower propeller being so positioned as to throw liquid from its periphery and against the adjacent side walls and bottom wall, said liquid being deflected by the said walls forwardly of the vertical plane in which the said propeller is located.

20. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, one of said propellers being located close to a side wall of the tank and adjacent the bottom wall thereof, said lower propeller being so positioned as to throw liquid from its periphery and against the adjacent side walls and bottom wall, said liquid being deflected by the said walls forwardly by the vertical plane in which the said propeller is located, said upper propeller being adapted to hurl liquid from its periphery and against the adjacent side walls, said side walls deflecting the said liquid forwardly of the vertical plane in which the said propeller is located.

21. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, each propeller shaft being located in a radius of the said tank, one of said propellers being located close to a side wall of the tank and adjacent the bottom wall thereof, said upper propeller being adapted to hurl liquid from its periphery and against the adjacent side walls, said side walls deflecting the said liquit forwardly of the vertical plane in which the said propeller is located.

22. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, each propeller shaft being located in a different radius of the said tank, one of said propellers being located close to a side wall of the tank and adjacent the bottom wall thereof, said upper propeller being adapted to hurl liquid from its periphery and against the adjacent side walls, said side walls deflecting the said liquid forwardly of the vertical plane in which the said propeller is located, said lower propeller being so positioned as to throw liquid from its periphery and against the adjacent side walls and bottom wall, and said liquid being deflected by the said walls forwardly of the vertical plane in which the said propeller is located.

23. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, each of said propellers being located close to a side wall, one of the said propellers being located adjacent the bottom wall of the said tank, each propeller shaft being located in a radius of the said tank, said upper propeller being adapted to hurl liquid from its periphery and against the adjacent side walls, said side walls deflecting the said liquid forwardly of the vertical plane in which the said propeller is located, and said lower propeller being so positioned as to throw liquid from its periphery and against the adjacent side walls and bottom wall, said liquid being deflected by the side walls forwardly of the vertical plane in which the said propeller is located.

24. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, each of said propellers being located close to a side wall, one of the said propellers being located adjacent the bottom wall of the said tank, each propeller shaft being located in a different radius of the said tank, said upper propeller being adapted to hurl liquid from its periphery and against the adjacent side walls, said side walls deflecting the said liquid forwardly of the vertical plane in which the said propeller is located, and said lower propeller being so positioned as to throw liquid from its periphery and against the adjacent side walls and bottom wall, said liquid being deflected by the said walls forwardly of the vertical plane in which the said propeller is located.

25. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, one of said propellers being located close to a side wall of the tank and adjacent the bottom wall thereof, and said bottom wall being downwardly dished.

26. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, said propeller shafts being located in the same longitudinal plane, one of said propellers being located close to a side wall of the tank and adjacent the bottom wall thereof, and said bottom wall being downwardly dished.

27. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, one of said propellers being located close to a side wall of the tank and adjacent the bottom wall thereof, each propeller shaft being located in a different radius of the said tank, and said bottom wall being downwardly dished.

28. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, one of said propellers being located close to a side wall of the tank and adjacent the bottom wall thereof, said lower propeller being so positioned as to throw liquid from its periphery and against the adjacent side walls and bottom wall, said liquid being deflected by the said walls forwardly of the vertical plane in which the said propeller is located, and said bottom wall being downwardly dished.

29. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, said propeller shafts being located in the same longitudinal plane, one of said propellers being located close to a side wall of the tank and adjacent the bottom wall thereof, said lower propeller being so positioned as to throw liquid from its periphery and against the adjacent side walls and bottom wall, said liquid being deflected by the said walls forwardly of the vertical plane in which the said propeller is located, and said bottom wall being dished.

30. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, each propeller shaft being located in a different radius of the said tank, one of said propellers being located close to a side wall of the tank and adjacent the bottom wall thereof, said lower propeller being so positioned as to throw liquid from its periphery and against the adjacent side walls and bottom wall, said liquid being deflected by the said walls forwardly of the vertical plane in which the said propeller is located.

31. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, each of said propellers being located close to a side wall, one of the said propellers being located adjacent the bottom wall of the said tank, each propeller shaft being located in a radius of the said tank, said lower propeller being so positioned as to throw liquid from its periphery and against the adjacent side walls and bottom wall, said liquid being deflected by the said walls forwardly of the vertical plane in which the said propeller is located, and said bottom wall being downwardly dished.

32. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, each of said propellers being located close to a side wall, one of the said propellers being located adjacent the bottom wall of the said tank, each propeller shaft being located in a different radius of the said tank, said lower propeller being so positioned as to throw liquid from its periphery and against the adjacent side walls and bottom wall, said liquid being deflected by the said walls forwardly of the vertical plane in which the said propeller is located, and said bottom wall being downwardly dished.

33. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, one of said propellers being located close to a side wall of the tank and adjacent the bottom wall thereof, said lower propeller being so positioned as to throw liquid from its periphery and against the adjacent side walls and bottom wall, said liquid being deflected by the said walls forwardly of the vertical plane in which the said propeller is located, said upper propeller being adapted to hurl liquid from its periphery and against the adjacent side walls, said side walls deflecting the said liquid forwardly of the vertical plane in which the said propeller is located, and said bottom wall being downwardly dished.

34. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, each propeller shaft being located in a radius of the said tank, one of said propellers being located close to a side wall of the tank and adjacent the bottom wall thereof, said upper propeller being adapted to hurl liquid from its periphery and against the adjacent side walls, said side walls deflecting the said liquid forwardly of the vertical plane in which the said propeller is located, and said bottom wall being downwardly dished.

35. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, each propeller shaft being located in a different radius of the said tank, one of said propellers being located close to a side wall of the tank and adjacent the bottom wall thereof, said upper propeller being adapted to hurl liquid from its periphery and against the adjacent side walls, said side walls deflecting the said liquid forwardly of the vertical plane in which the said propeller is located, said lower propeller being so positioned as to throw liquid from its periphery and against the adjacent side walls and bottom wall, and said liquid being deflected by the said walls forwardly of the vertical plane in which the said propeller is located, and said bottom wall being downwardly dished.

36. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, each of said propellers being located close to a side wall, one of the said propellers being located adjacent the bottom wall of the said tank, each propeller shaft being located in a radius of the said tank, said upper propeller being adapted to hurl liquid from its periphery and against the adjacent side walls, said side walls deflecting the said liquid forwardly of the vertical plane in which the said propeller is located, and said lower propeller being so positioned as to throw liquid from its periphery and against the adjacent side walls and bottom wall, said liquid being deflected by the said walls forwardly of the vertical plane in which the said propeller is located, and said bottom wall being downwardly dished.

37. In combination, a tank, cylindrical side walls for the said tank, a bottom wall, a first propeller, a second propeller, said first and second propellers being mounted in the tank on horizontal shafts extending through the side walls, said propellers being located each in a different horizontal plane, each of said propellers being located close to a side wall, one of the said propellers being located adjacent the bottom wall of the said tank, each propeller shaft being located in a different radius of the said tank, said upper propeller being adapted to hurl liquid from its periphery and against the adjacent side walls, said side walls deflecting the said liquid forwardly of the vertical plane in which the said propeller is located, and said lower propeller being so positioned as to throw liquid from its periphery and against the adjacent side walls and bottom wall, said liquid being deflected by the said walls forwardly of the vertical plane in which the said propeller is located, and said bottom wall being downwardly dished.

In witness whereof, I have hereunto signed my name this 8 day of June, 1920.

NIELS D. NIELSEN.